United States Patent
Hayashi

(10) Patent No.: US 7,324,809 B2
(45) Date of Patent: Jan. 29, 2008

(54) PORTABLE TELEPHONE SET AND CONTROL METHOD THEREOF

(75) Inventor: Yuka Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 150 days.

(21) Appl. No.: 10/840,363

(22) Filed: May 7, 2004

(65) Prior Publication Data

US 2004/0224721 A1    Nov. 11, 2004

(30) Foreign Application Priority Data

May 8, 2003    (JP) .............................. 2003-130252

(51) Int. Cl.
*H04L 12/58* (2006.01)
(52) U.S. Cl. .................. 455/412.1; 455/410; 455/411; 455/412.2; 455/413
(58) Field of Classification Search ............. 455/414.1, 455/412.1, 419, 410, 10
See application file for complete search history.

(56) References Cited

U.S. PATENT DOCUMENTS

| | | | | |
|---|---|---|---|---|
| 6,061,571 A | * | 5/2000 | Tamura | 455/463 |
| 6,118,994 A | * | 9/2000 | Usami et al. | 455/412.1 |
| 6,938,100 B2 | * | 8/2005 | Kang | 709/248 |
| 6,965,404 B2 | * | 11/2005 | Hosoda et al. | 348/231.6 |
| 7,062,032 B1 | * | 6/2006 | Bloom et al. | 379/265.04 |
| 2004/0088575 A1 | * | 5/2004 | Piepho et al. | 713/201 |
| 2004/0192260 A1 | * | 9/2004 | Sugimoto et al. | 455/412.1 |
| 2004/0192268 A1 | * | 9/2004 | Pyhalammi | 455/414.1 |
| 2004/0203601 A1 | * | 10/2004 | Morriss et al. | 455/411 |

FOREIGN PATENT DOCUMENTS

JP    2000-216858    8/2000

* cited by examiner

*Primary Examiner*—Duc M. Nguyen
*Assistant Examiner*—Dai Phuong
(74) *Attorney, Agent, or Firm*—Foley & Lardner LLP

(57) ABSTRACT

A check is made as to whether a received mail contains a password as a combination of preliminarily registered symbols or letters. When the password is found, a telephone diary in a database is retrieved by using a letter train other than the password contained in the received mail. When a telephone number corresponding to the other letter train is contained in the telephone diary, the corresponding telephone number is mail returned to the source of transmission. When no such telephone number is contained, this fact is mail returned.

9 Claims, 4 Drawing Sheets

PORTABLE TELEPHONE SET AND CONTROL METHOD THEREOF

BACKGROUND OF THE INVENTION

This application claims benefit of Japanese Patent Application No. 2003-130252 filed on May 09, 2003, the contents of which are incorporated by the reference.

The present invention relates to portable telephone sets and, more particularly, to a portable telephone set capable of reading out and utilizing personal data registered therein from a different telephone set or the like.

Hitherto, it has been possible to register many personal data such as a telephone diary or a schedule book in a portable telephone set. However, when the user forgets the portable telephone set to be carried, he or she can no longer externally refer to these personal data.

Accordingly, Japanese Patent Laid-Open No. 2000-216858, for instance, proposes a method of externally utilizing personal data of a personal telephone set. In this well-known method, when a personal password inputted by dialing is received and found to be identical, a personal data retrieval code is requested, and personal data is called out from a memory based on the retrieval code and is outputted (see Literature 1: Japanese Patent Laid-Open 2000-216858, for instance).

In the method described in the Literature 1, however, when the individual password is identical, a question as to whether the personal data call-out is requested is to be answered in term of "Yes" or "No". In addition, it is necessary to answer a question as to whether call arrival history or a message is requested. Furthermore, it is necessary to answer a question concerning the retrieval code. Therefore, the operation is cumbersome and time-consuming.

SUMMARY OF THE INVENTION

The present invention was made in view of the above prior art problems, and it has an object of providing a portable telephone set and control method thereof capable of simple and safe reading out of the personal data with improved convenience.

According to an aspect of the present invention, there is provided a portable telephone set comprising a database with data stored therein, a means for checking whether a preliminarily registered password is contained in a received mail, a means for checking, when the password is found to be contained, whether a letter train other than the password is also contained in the received mail, a means for retrieving, when the other letter train is found to be contained in the received Mail, the database by using the other letter train, and a means for mail returning, when data corresponding to the other letter train is found to be in the database, the corresponding data to the source of transmission.

When the data corresponding to the other letter train is not found in the database, this fact is mail returned to the source of transmission. The retrieving means retrieves a telephone diary in the database by using the other letter train. The retrieving means retrieves a schedule book in the database by using the other letter train. The transmitting means transits data to a preliminarily registered main address or telephone number.

According to another aspect of the present invention, there is provided a portable telephone set comprising a database with data stored therein, a means for collating a cipher inputted at the time of a call arrival with a preliminarily registered cipher, a means for converting, when both the ciphers are identical, a retrieval code inputted in voice to data, a means for retrieving the database by using the converted retrieval code, and a means for transmitting, when the data corresponding to the retrieval code is found in the database, the corresponding data in voice to the source of transmission.

The data corresponding to the retrieval code is not found in the database, the fact is transmitted in voice to the source of transmission. The retrieving means retrieves, when the retrieval code is a name, the telephone diary in the database. The retrieving means retrieves, when the retrieval code is a date, the schedule book in the database. The transmitting means transmits data in voice to a preliminarily registered telephone number or mail address.

According to other aspect of the present invention, there is provided a control method of a portable telephone set comprising steps of checking whether a preliminarily registered password is contained in a received mail, checking, when the password is found to be contained, whether a letter train other than the password is contained in the received mail, retrieving, when the other letter train is found to be contained in the received mail, database by using the other letter train, and mail returning, when data corresponding to the other letter train is found to be in the database, the corresponding data to the source of transmission.

According to further aspect of the present invention, there is provided a control method of a portable telephone set comprising steps of checking as to whether a received mail contains a password as a combination of preliminarily registered symbols or letters, retrieving, when the password is found, a telephone diary in a database by using a letter train other than the password contained in the received mail; and mail returning, when a telephone number corresponding to the other letter train is contained in the telephone diary, the corresponding telephone number to the source of transmission, and when no such telephone number is contained, mail returning this fact.

Other objects and features will be clarified from the following description with reference to attached drawings.

PREFERRED EMBODIMENTS OF THE INVENTION

Preferred embodiments of the present invention will now be described with reference to the drawings.

Figure 1:
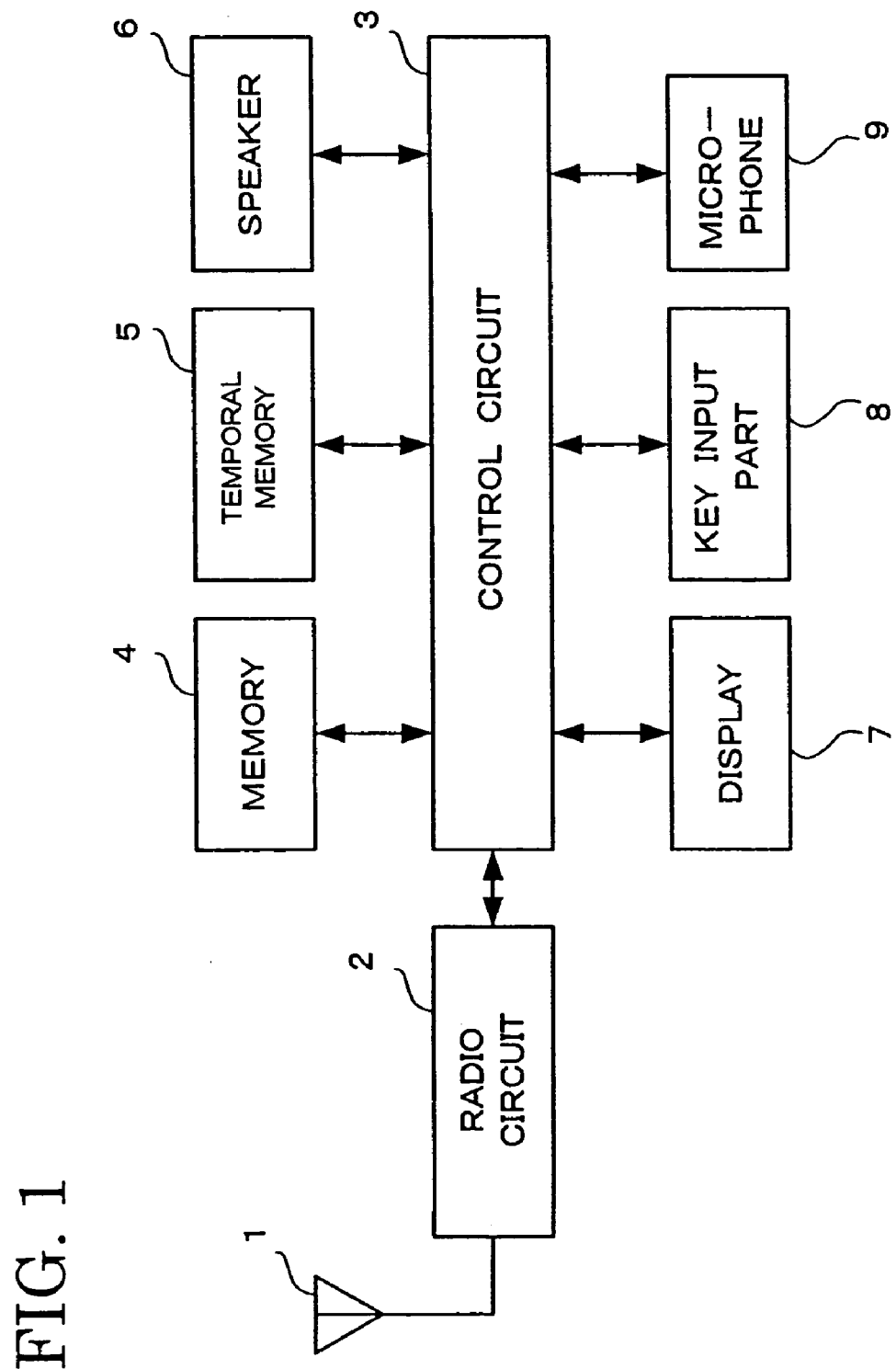
FIG. 1 is a block diagram showing the arrangement of the first embodiment of the present invention.

FIG. 1 is a block diagram showing the arrangement of the first embodiment of the present invention. Referring to the Figure, reference numeral 1 designates an antenna, numeral 2 a radio circuit for transmitting and receiving radio signals, numeral 3 a control circuit for controlling various circuits in the telephone sets, and numeral 4 a memory as a database, in which various data of a telephone diary, a schedule book, etc. are registered. Also, reference numeral 5 designates a temporal memory for temporarily storing data, numeral 6 a loudspeaker for outputting voice, numeral 7 a liquid crystal or like display part for displaying various data, numeral 8 a key input part for inputting various data such as telephone numbers and mails, numeral 9 a microphone for inputting voice.

In this embodiment, the control circuit 3 checks whether a received mail having been received via the antenna 1 and the radio circuit 2 and stored in the temporal memory 5 contains identification symbols or letters preliminarily registered in the memory 4. The user has preliminarily formed such symbols or letters as a combination and registered as a password in the memory 4.

When such a password is found, the control circuit 3 automatically retrieves a telephone diary stored in the memory 4 by using a letter train (i.e., retrieval keyword) other than the identification symbols or letters of the mail data. The result is mail returned to the mail source. In other words, when subject data is found, it is extracted. When no subject data is found, on the other hand, a preliminarily prepared response message, for instance "no subject data", is mail returned to the mail source.

Figure 2:
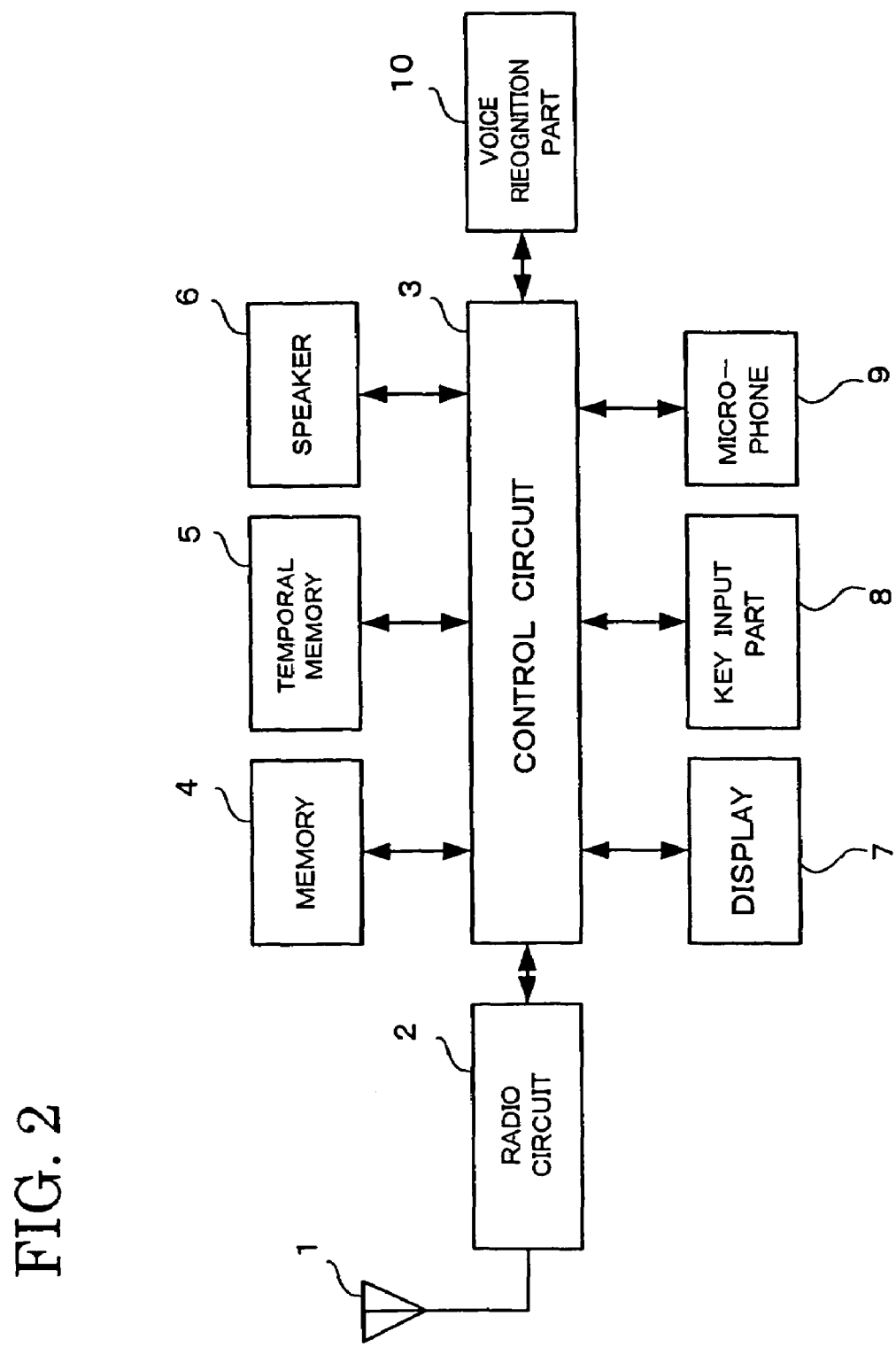
FIG. 2 is a flow chart showing operation of the embodiment of FIG. 1.

The operation of the embodiment will now be described with reference to the flow chart shown in FIG. 2. In this case, an operation of automatically retrieving personal data concerning the telephone diary and mail returning the retrieved data will be described. As noted above, the terminal user preliminarily registers identification symbols or letters as a combination in the memory 4 of the portable telephone set.

At this time, the identification symbols or letters are set individually, so that any other person is incapable of taking out data. When the user receives a mail (step 201), he or she checks whether the identification symbols or letters preliminarily registered in the memory 4 are contained in the received mail (step 202).

When no identification symbols or letters are contained, the portable telephone set is restored to the waiting state (START). When the identification symbols or letters are contained, a check is executed as to whether other letter train (i.e., retrieval keyword) is contained (step 203). When no other letter train is found, the portable telephone set is restored to the waiting state (START). When the other letter train is found, the portable telephone set retrieve the telephone diary stored in the memory 4 by using the other letter train (step 204). In this instance, a name letter train is used as the other letter train, and the retrieval is executed whether a telephone number corresponding to the name is present.

Then, the user checks the retrieval result (step 205). When the subject data is found, this data is extracted (step 206) and automatically returned to the mail source (step 207), while when no subject is found, a response message, for instance "no data", preliminarily prepared in the memory 4 is taken out (step 207) and automatically returned to the mail source (step 208). Subsequently, the waiting state is restored (START).

As shown above, in this embodiment in the event of, for instance, forgetting the portable telephone set to be carried, it is possible to obtain, from an external telephone set, data registered in the portable telephone set, and the convenience is thus improved. Also, since each user can individually preliminarily register identification symbols or letters for causing automatic process in the portable telephone set, it is possible to prevent stealing of data by other persons.

A second embodiment of the present invention will now be described. In this second embodiment, the retrieval acceptance and transmission of the retrieval result are carried out in a different method from the method in the first embodiment. Specifically, the acceptance of the data retrieval is made with cipher input by a push-button, and vocal methods are used for the retrieval keyword reception and retrieval result report.

Figure 3:
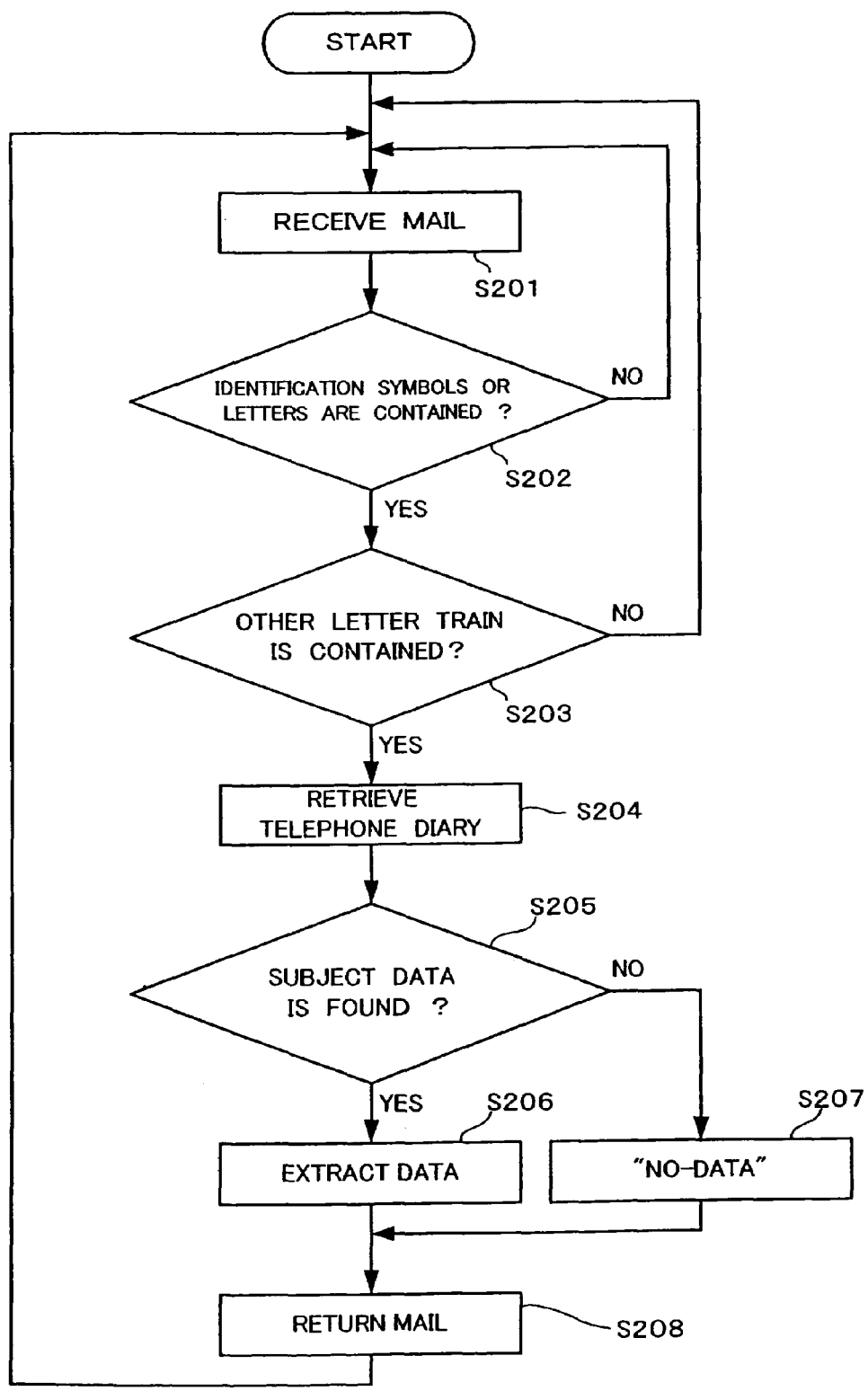
FIG. 3 is a block diagram showing the arrangement of a second embodiment.
Figure 4:
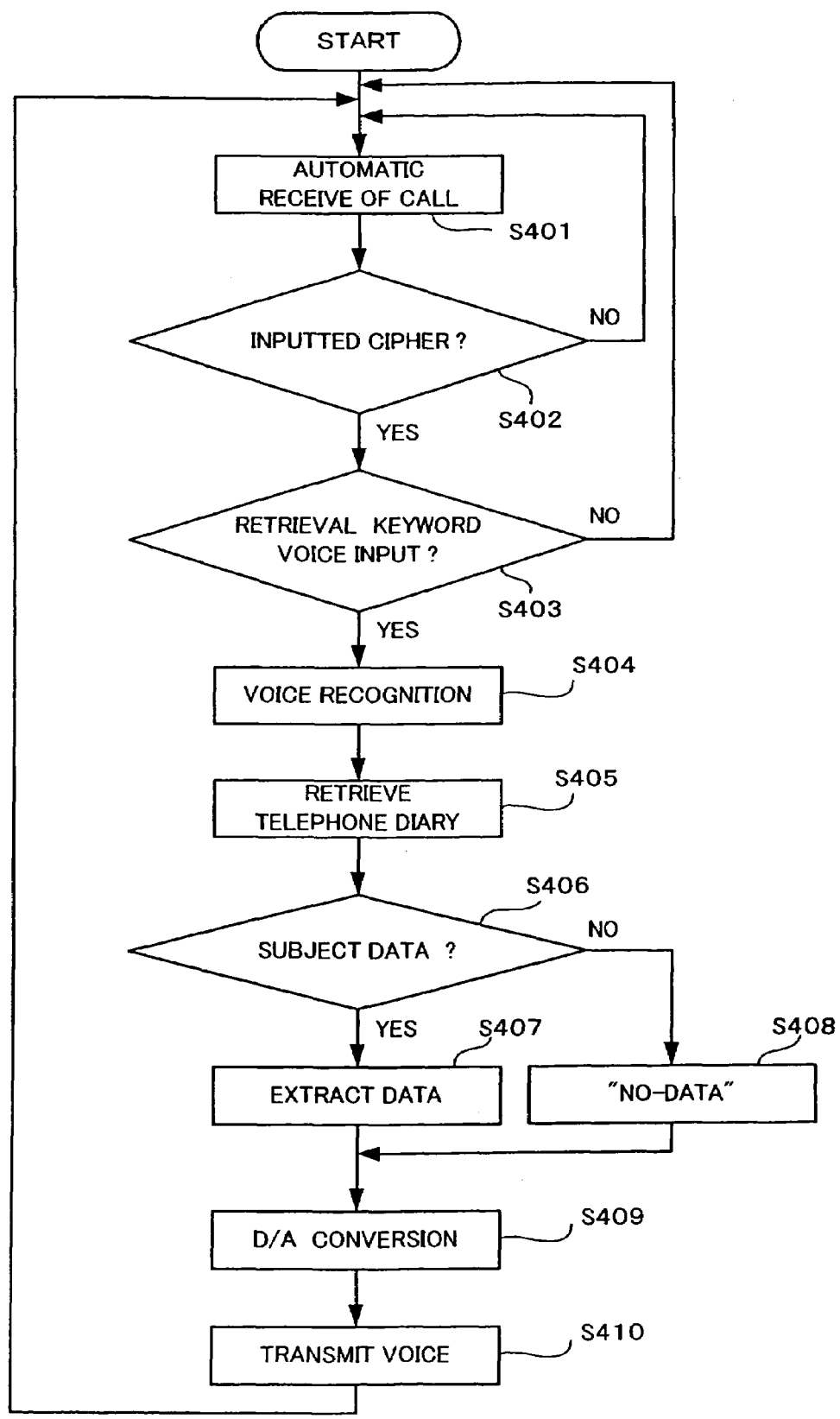
FIG. 4 is a flow chart showing operation of the embodiment of FIG. 3.

FIG. 3 is a block diagram showing the arrangement of a second embodiment. This FIG. 3 embodiment is different from the block diagram of FIG. 1 showing the first embodiment in that it additionally comprises a voice recognition part 10 for recognizing voice. The remainder of the arrangement is the same as in the first embodiment. The operation of the second embodiment will now be described with reference to FIGS. 3 and 4.

The portable telephone set user preliminarily registers a cipher for external accessing in the memory 4 of the portable telephone set. When the portable telephone set automatically receives a call (step 401), the control circuit 3 checks whether the input of a cipher registered in the memory 4 (step 402). As noted above, the cipher is inputted by the push-button. When the inputted cipher is identical with a registered cipher, subsequently inputted voice is temporarily stored in the temporal memory 5 for conversion of the voice to data in the voice recognition part 10 (step 403).

The inputted voice contains a retrieval keyword, a name, for instance, being used as the retrieval keyword. Using this retrieval keyword, the control circuit 3 retrieves the telephone diary registered in the memory 4 (step 405), and checks whether a pertinent subject data (i.e., telephone number) is contained in the designated retrieval keyword (i.e., name) (step 406).

When the subject data is found, the user extracts this data (step 407), feeds the data (i.e., telephone number) to a D/A converter (not shown) for D/A conversion (step 409), and transmits the data in voice via the radio circuit 2 and the antenna 1 to the opposite side of communication (step 410).

When no subject data is found, the user feeds a response message, for instance "no data", preliminarily prepared in the memory 4 to a D/A converter (not shown) for D/A conversion (step 409), and transmits the data in voice via the radio circuit 2 and the antenna 1 to the opposite side of communication (step 410).

As has been shown, in the above embodiments, in the event of forgetting the portable telephone set to be carried, a retrieval keyword can be inputted in voice or as a cipher. It is thus possible to obtain persona data registered in the portable telephone set from a general telephone set or a Public telephone set, an the convenience can be further improved.

While the first and second embodiments have been described such that retrieved data is transmitted to the source of transmission, this is by N means limitative; it is also possible to transmit the data to a mail address or a telephone number preliminarily registered in the portable telephone set.

Also, while the first and second embodiments have concerned with an example of retrieving the telephone diary with a name as a retrieval keyword, according to the present invention telephone diary is by no means limitative, and it is also possible to let a schedule book in the memory 4 to be retrieved. In this case, a "date" is inputted as a retrieval keyword after the identification letters or symbols, and when the date data is found, the schedule book registered in the memory 4 is retrieved by using the date data, and the schedule of the pertinent date is transmitted. Furthermore, according to the present invention it is possible to all personal data registered in the memory be read out and transmitted the source of transmission or registered addresses or telephone Numbers.

As has been described in the foregoing, according to the present invention in the even t of forgetting the portable telephone set to be carried, personal data registered therein can be externally utilized, and the convenience can be improved. Also, since all the processes are executed automatically, satisfactory operability can be ensured. Furthermore, since each user individually registers a password such as identification symbols or letters, it is possible to prevent leakage of individual data.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable telephone set comprising:
   a database with data stored therein,
   a temporary memory for storing a received mail,
   a first means for checking whether a preliminarily registered password, registered in the database, is contained in the received mail,
   a second means for checking, when the password is found to be contained, whether a letter train other than the password is also contained in the received mail,
   a means for retrieving, when the other letter train is found to be contained in the received mail, data from the database by using the other letter train,
   a means for mail returning, when data corresponding to the other letter train is found to be in the database, the corresponding data to a source of transmission of the received mail, and
   a data-to-voice conversion unit configured to, when the data corresponding to the other letter train is not found in the database when the first checking means has determined that the preliminarily registered password is contained in the received mail, converting a message indicating that the data corresponding to the other letter train is not found in the database into voice data,
   wherein when the data corresponding to the other letter train is not found in the database when the first checking means has determined that the preliminarily registered password is contained in the received mail, this fact is mail returned to the source of transmission of the received mail,
   wherein the temporary memory is independent from the first means, the second means, the retrieving means, the mail returning means, and the database, and
   wherein the converted message is output by the mail returning means to be played as a voice message at the source of transmission of the received mail.

2. The portable telephone set according to claim 1, wherein the retrieving means retrieves a telephone diary in the database by using the other letter train when the other letter train is found in the database.

3. The portable telephone set according to claim 1, wherein the retrieving means retrieves a schedule book in the database by using the other letter train when the other letter train is found in the database.

4. The portable telephone set according to claim 1, wherein the mail returning means transmits data to a preliminarily registered main address or telephone number when the other letter train is found in the database.

5. The portable telephone set according to claim 1, wherein the other letter train corresponds to a retrieval keyword or keywords that are used by the retrieving means to retrieve information from the database to be provided to the source of transmission by way of the mail returning means.

6. Control method of a portable telephone set comprising steps of:
   storing a received mail in a temporary memory;
   checking whether a preliminarily registered password, registered in a database, is contained in the received mail;
   checking, when the password is found to be contained, whether a letter train other than the password is contained in the received mail;
   retrieving, when the other letter train is found to be contained in the received mail, data from the database by using the other letter train,
   mail returning, when data corresponding to the other letter train is found to be in the database, the corresponding data to a source of transmission of the received mail, and
   converting, when the data corresponding to the other letter train is not found in the database when it has been determined that the preliminarily registered password is contained in the received mail, a message indicating that the data corresponding to the other letter train is not found in the database into voice data,
   wherein when the data corresponding to the other letter train is not found in the database when the first checking step has determined that the preliminarily registered password is contained in the received mail, this fact is mail returned to the source of transmission of the received mail,
   wherein the temporary memory is independent from other components making up the portable telephone set, and
   wherein the converted message is output in the mail returning step to be played as a voice message at the source of transmission of the received mail.

7. The control method according to claim 6, wherein the other letter train corresponds to a retrieval keyword or keywords that are used by the retrieving step to retrieve information from the database to be provided to the source of transmission by way of the mail returning step.

8. Control method of a portable telephone set comprising steps of:
   checking as to whether a received mail contains a password as a combination of preliminarily registered symbols or letters;
   retrieving, when the password is found, a telephone diary in a database by using a letter train other than the password contained in the received mail;
   mail returning, when a telephone number corresponding to the other letter train is contained in the telephone diary, the corresponding telephone number to a source of transmission of the received mail, and when no such telephone number is contained, mail returning this fact, and
   converting, when the data corresponding to the other letter train is not found in the database when it has been determined that the preliminarily registered password is contained in the received mail, a message indicating that the data corresponding to the other letter train is not found in the database into voice data,
   wherein when the data corresponding to the other letter train is not found in the database when the checking step has determined that the password is contained in the received mail, this fact is mail returned to the source of transmission of the received mail, the data corresponding to the other letter train being non-password data,
   wherein the converted message is output in the mail returning step to be played as a voice message at the source of transmission of the received mail.

9. The control method according to claim 8, wherein the other letter train corresponds to a retrieval keyword or keywords that are used by the retrieving step to retrieve information from the database to be provided to the source of transmission by way of the mail returning step.

* * * * *